May 31, 1927.  
C. H. SHEASLEY ET AL  
1,630,637  
COMBINED AUTOMATIC AND MANUAL CONTROL FOR DRILLING ENGINES  
Filed April 7, 1924  3 Sheets-Sheet 3

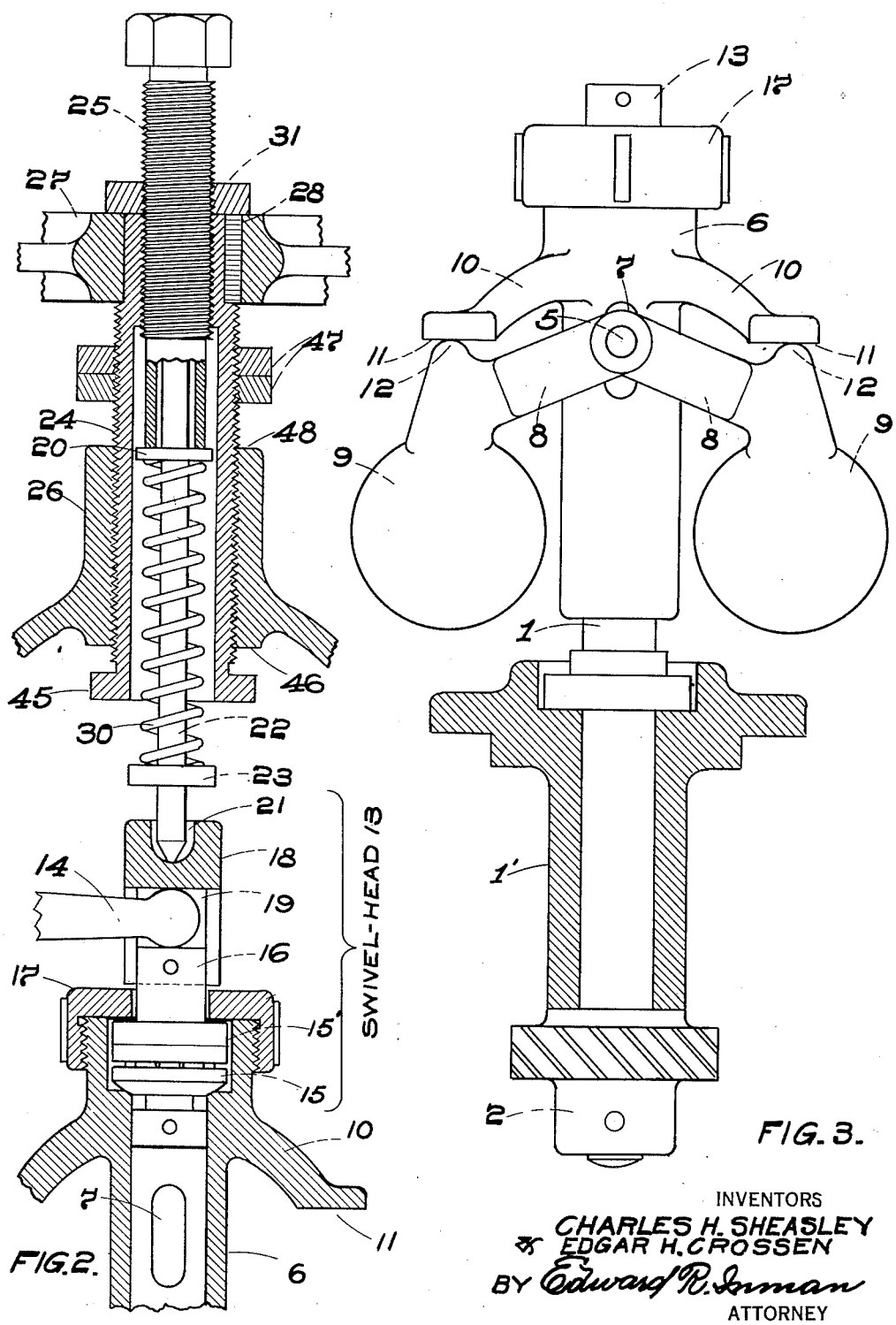

GAS OR STEAM THROTTLE

OIL PUMP FOR OIL ENGINE

INVENTORS  
CHARLES H. SHEASLEY &  
EDGAR H CROSSEN  
BY Edward W. Inman  
ATTORNEY Patented May 31, 1927.

1,630,637

UNITED STATES PATENT OFFICE.

CHARLES H. SHEASLEY AND EDGAR H. CROSSEN, OF FRANKLIN, PENNSYLVANIA.

COMBINED AUTOMATIC AND MANUAL CONTROL FOR DRILLING ENGINES.

Application filed April 7, 1924. Serial No. 704,890.

The object, construction and operation of our improved combined automatic and manual control for drilling engines, are herein set forth with sufficient clearness to enable those skilled in the respective arts to which its construction and use respectively relate, to make and use the same.

In order to attain the highest degree of efficiency, a very close regulation of a drilling engine is essential, a wide range of speeds is essential, and a control must be adapted to produce any desired speed quickly, and when produced it must be adapted to hold it steadily at that point.

In drilling operations, the conditions under which a control must operate are not only exacting but they are constantly changing, and such changes are due to many different causes, among which may be mentioned the following:

(a) That in deep-well drilling operations, one cycle of the drill,—that is, an up-stroke and a down-stroke—corresponding to one complete revolution of the band-wheel and crank-shaft of the drilling rig, required from six to ten revolutions of the engine, depending upon the relative diameters of said bandwheel and the pulley of the engine. During the up-stroke of the drill, the maximum of power of the engine is required, and when the down-stroke of the drill is taking place, substantially no power output of the engine is required. This means, therefore, that in one complete cycle of the drilling operation, the maximum of power output of the engine is required during from three to five revolutions of the engine, and a minimum of power output is required during a successive number of revolutions, or substantially so. A control device for such an engine must be sufficiently stable, or non-sensitive, in its action as not to reduce the supply of motive agent to the engine during the no-load interval of this cycle, since, if it did reduce it, the engine would lag at the beginning of the full-load interval, and this would throw the speed of the engine out of co-ordination with the proper motion of the drilling tools.

(b) That in withdrawing the drilling tools from the well, also in replacing them within the well; in bailing and cleaning out the well; also in pulling rods and tubing and replacing them, all possible speeds of the engine from maximum to minimum must be employed within very short intervals of time.

(c) The speed of the engine must be regulated and adjusted in accordance with the weight of the tools and the length of the drilling cable or depth of the well, also, to some extent according to the density of the "sand" or rock that is being drilled; some of the adjustments mentioned in this paragraph are quite minute or delicate adjustments, and require only slight manipulations of the control device, as the drilling operation progresses.

(d) A suitable control for a drilling engine must, in addition to being well adapted to manual regulation, be also capable of automatically holding the engine to the speed to which it has been manually adjusted, and thus be adapted to prevent the engine from "running away" in cases of emergency, as when the engine is suddenly released from its load, in any way.

(e) The control must be adapted to manual regulation and manipulation from a distance, and especially from the drillers station in the derrick, and such manual control must be limited by means of positive stops in both directions, so that the engine cannot, upon the one hand, be caused to stop, or, upon the other hand, be caused to have too high a speed, but may be caused to operate at any speed between the pre-determined minimum and maximum limits.

It is, therefore, the object of this invention, to provide a combined automatic and manual control for drilling engines, which is adapted to properly and effectually control the engine under all the above-mentioned conditions and requirements.

The construction whereby we are enabled to attain said object is clearly illustrated in the accompanying drawings in which:

Fig. 2 is an enlarged view of the upper portion of Fig. 1.

Fig. 3 is an enlarged view of the lower portion of Fig. 1, with the exception that the sleeve moved by the fly-balls or centrifugal members is not shown in section of this view.

Figure 1:
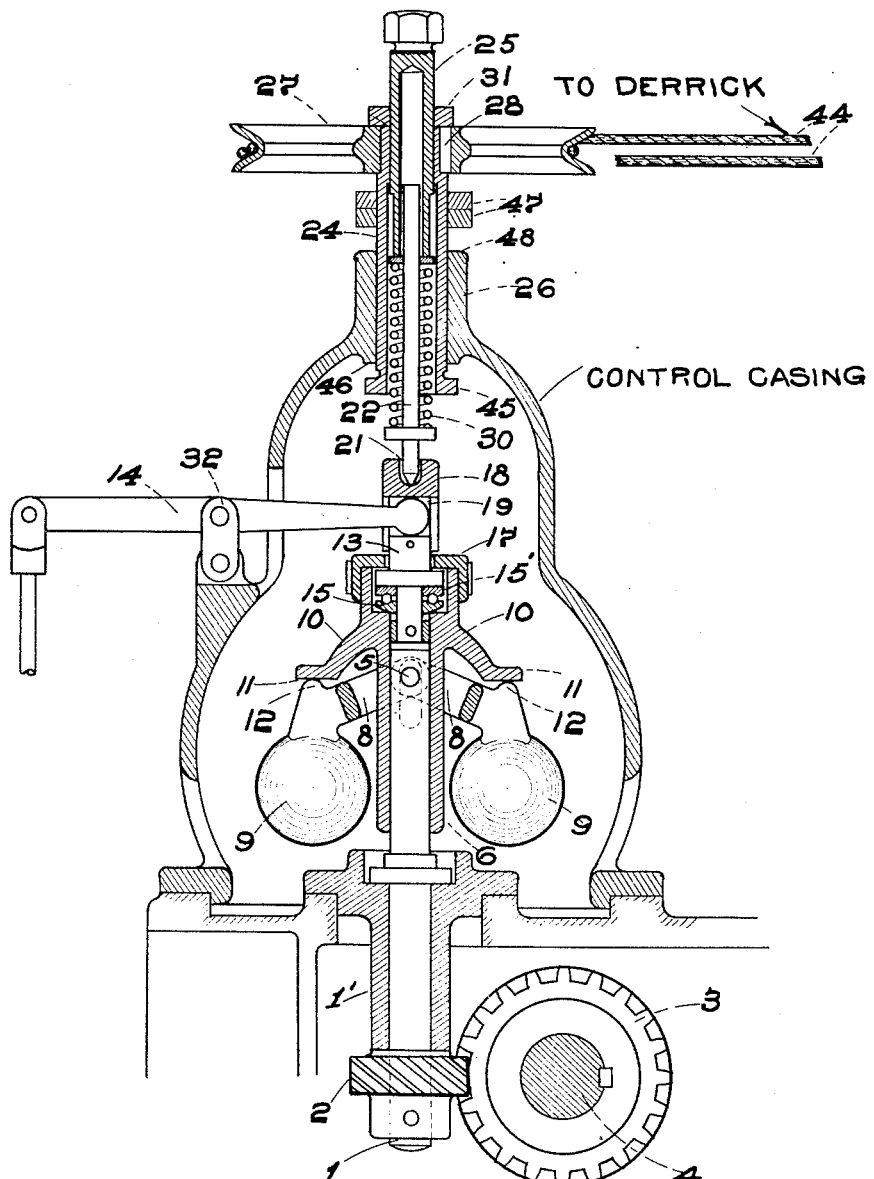
Fig. 1 is a central, vertical section of our improved control.

The construction illustrated in said drawings is substantially as follows:

A centrifugal organization,—which is most clearly illustrated in Fig. 3—, is provided and comprises a vertically-extending shaft which is adapted to be revolubly driven by the engine.

Said shaft 1 is revolubly mounted within any suitable form of bearing as 1' and motion may be transmitted thereto by means of a helical pinion 2 and gear 3; said gear 3 may be affixed to and driven by a lay shaft 4. Said shaft 1 is provided adjacent its upper end with a transversely-extending pin 5 which is arranged with both its ends projecting from said shaft to form a pivotal attachment for fly-balls or centrifugal members.

Upon said upper end of said shaft 1 is mounted a vertically-slidable actuator sleeve 6, which is adapted to have a longitudinally sliding movement upon said shaft 1 but is caused to be revolved thereby and therewith by means of said pin 5 which extends through longitudinally-disposed slots 7 in said sleeve 6.

The respective ends of said pin 5 are adapted to engage an eye formed in the extremities of each of the arms 8 of said fly-balls 9, and to thus serve as the pivotal point for said balls upon which they may swing outwardly, as centrifugal force acts thereon.

Said actuator sleeve is provided with two, oppositely-positioned, outwardly-extending actuator arms 10, the under side of the outer end of each of which is provided with a contact face 11 adapted to contact with the actuator points 12 of said centrifugal members 9. By means of this arrangement, when said members swing outwardly and upwardly, said sleeve 6 is thereby actuated upwardly, and said upward movement is utilized to actuate a motive-agent regulating device of the engine, as hereafter set forth.

A swivel-head 13 is carried at the upper end of said sleeve 6, which head comprises the ball bearing 15, 15', the swivel-pin 16, and the lever-engaging block 18; said block 18 being adapted to engage the throttle-actuating lever 14. Said swivel-head 13 is arranged to be stationary, so that it need not revolve with said sleeve 6, in the following manner: The upper end of said sleeve is provided with a chamber for the reception of a ball bearing consisting of said plates 15 and 15', together with the usual balls; said plate 15' carries the swivel-pin 16 which projects through the cap 17 of said chamber; a lever-engaging block 18 is rigidly secured to said pin 16 and an eye 19 is formed through said block for the reception of one end of the actuating lever 14.

The upper end of said block 18 is provided with a depression or shallow socket 21 for the reception of the lower end of a compression rod 22; said rod extends upwardly into a regulating head which is arranged in axial alinement with said shaft 1 and comprises an outer, tubular control-sleeve 24, which is externally provided, throughout the greater portion of its length with a screw-thread and as also provided in its upper end with an internal screw-thread. Arranged in co-operation with the internal screw-thread of said control-screw 24, is a tubular, externally-threaded adjusting screw 25, the purpose of which will presently appear.

Said control-screw 24 is carried by means of its external thread in an internally-threaded boss formed at the upper end of the control casing 26, and by means of said threads, is vertically adjustable within said casing. The upper end of said control-screw 24 is provided with a rigidly-attached cable-pulley 27, a key 28 being employed to cause said control-screw to be turned or revolved by means of said pulley, when manual control is to be employed.

The compression-rod 22, previously mentioned, is arranged with its lower end resting in the socket 21 and its upper end extending into the bore of said adjusting-screw 25. Said rod 22 is provided with an integral, annular or horizontally-extending flange 23, and between the upper face of this flange and the lower, end face of said screw 25,—or the loose washer 20, which is in contact with said end of said screw 25,—is interposed a spirally-wound compression spring 30, through which said compression rod passes.

The longitudinal adjustability of said adjusting-screw 25 is provided for the purpose of regulating the degree of compression of said spring 30, and a jam-nut 31 is provided for the purpose of securing said screw 25 in any selected position of its adjustability.

The object and function of said spring 30 is, to tend to resist the centrifugal action of the centrifugal members 9.

The throttle-actuating lever 14 is provided, intermediate its ends, with a fulcrum 32 which is carried by the casing 26. One end of said lever is arranged in engagement with said swivel-head 13 and it is adapted to be actuated vertically thereby. The outer end of said lever is adapted to be attached or connected to any suitable motive-agent regulating device, such as 34 of Fig. 4, 43 of Fig. 5, or the equivalent thereof.

Figure 4:
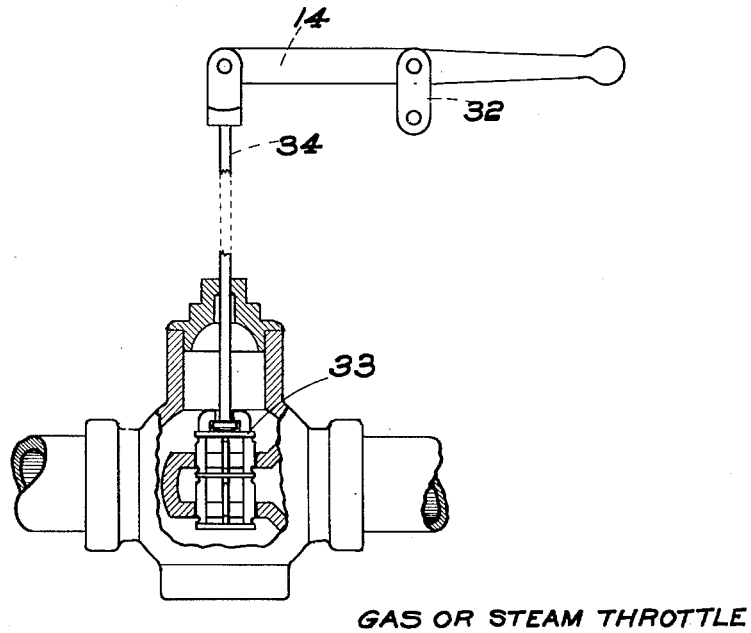
Fig. 4 illustrates one form of gas throttle that may be used with our control. This throttle is also suitable for use with steam engines.

In the Fig. 4 illustration is shown a common form of throttle that may be utilized to regulate the steam supplied to a steam engine, or the fuel-gas supplied to a gas engine.

Figure 5:
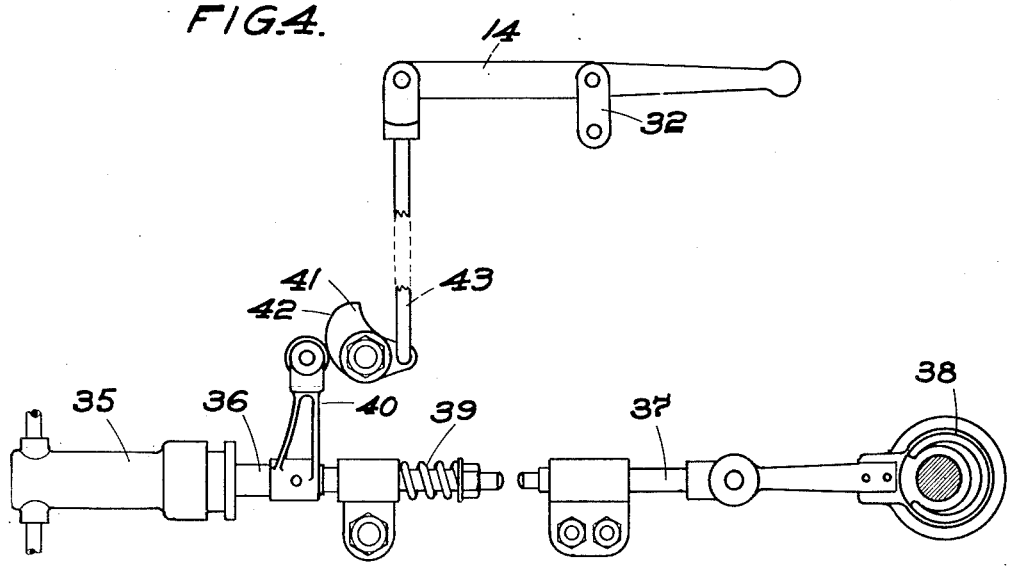
Fig. 5 is a view, more or less schematic, illustrating one way in which our improved control may be used in conjunction with a fuel-oil pump for oil engines.

In the Fig. 5 illustration is shown a type of fuel oil pump that is commonly employed to supply fuel-oil of the heavier grades to oil engines. In this illustration, the piston 36 of the pump is actuated by means of a reciprocating plunger 37, which is reciprocated by means of an eccentric 38 which is usually mounted upon the crank-shaft of the engine. At each outward stroke of said plunger 37 its free end comes into contact with the adjacent end of said piston 36 and actuates it inwardly, thus imparting a delivery or discharge stroke thereto. The opposite or intake stroke of said piston is caused by the recoil of the spring 39. Said piston 36 is provided with a perpendicularly-extending control arm 40, and, for the purpose of regulating and limiting the length of the stroke of said piston, a cam 41 is provided which is arranged to have its cam-face 42 actuated into the line of travel of the upper end of said arm 40, thus regulating the extent of travel of the piston 36 to which said arm is rigidly connected. This regulation controls the amount of fuel oil supplied to the engine. The lever 14 of this view is the lever 14 of the other figures of the drawings, and the reach-rod 43 may be any desired length.

Reverting now to the purpose and function of the cable pulley 27, this pulley is provided for the purpose of manually actuating the control-screw to produce either maximum speed or minimum speed of the engine, or any speed intermediate these limits at will.

It is essential that the regulation of a drilling engine may be effected from the driller's station in the derrick, and for this purpose a light cable 44 is passed around the pulley 27, and from thence extended to and passed around a similar pulley or other equivalent device located in the derrick, and in such convenient location relative to the driller's position that it may be manually operated by him without leaving his position at the cable and the drill-hole. By this means, said pulley 27 and the related control-screw 24 may be revolved and said screw caused to have longitudinal travel in said casing 26 so as to vary the compression of spring 30 and the stress exerted thereby upon rod 22 and sleeve 6, thus controlling the speed of the engine at will.

The driller's station is at a considerable distance from the engine, and in addition to this, the driller must usually keep his attention closely fixed upon the drilling cable and tools, or upon the sand-line when this is in use, and because of this it frequently becomes necessary for him to manipulate the speed-regulating device or hand-wheel in the derrick without looking at it. Because of this it is necessary to provide the control-screw 24 with positive stops to prevent accidental and unintentional over-regulation of the engine, as otherwise, the engine might be caused to stop, or, it might be caused to have a dangerously high speed. Such positive stops comprise the annular flange 45 formed upon the lower end of said control-screw, to check the travel of said screw in the upward, or speed-reducing direction, and the lock-nuts 47 arranged to contact with the upper face 48 of the casing 46 to check the travel of said screw in the downward, or speed-increasing direction.

When the initial adjustment of our control is to be made, as when it is first applied to an engine, the engine is started and the control screw 24 is arranged so that the stop 45 is in contact with the face 46 of the casing; the adjusting screw 25 is then adjusted to allow a maximum speed of the engine, whereupon the jam-nut 31 is tightened to maintain such adjustment. By means of the pulley 27, the control screw 24 is then adjusted downwardly until the desired minimum speed is produced; the lock nuts 47 are then moved into light contact with the face 48, whereupon said nuts are firmly locked together, thus producing a positive stop and limit to the downward adjustment of said screw 24. It will thus be seen that said nuts 47 constitute a stop of infinitesimally fine adjustment limiting the movement of the said screw in one direction and with said stop 45 constitute positive stops to the control movement of said screw 24, in both directions. These stops obviate the necessity of close attention, by the driller, to the manipulation of the control, when his attention is usually fully required elsewhere at the time the control is being manipulated.

Spring 30 is much heavier than those used in centrifugal governors, and in this heavier spring resides one of the novel, essential and valuable points of this invention, as a control for drilling engines. The reason for the employment of this heavy spring is to be found in the previously-stated and well-known fact that the load on such engines varies in the cycle of from six to ten revolutions of the engine shaft from full load to no load, said revolutions of the engine being substantially equally divided between said extremes, and during the no-load period of this cycle the control must be sufficiently stable, or non-sensitive as not to act to automatically reduce the motive-agent supply to the engine, since, if it did so, the engine would lag at the beginning of the full load interval, and this would greatly reduce the efficiency of the engine, by throwing it out of co-ordination with the proper motion of the drill.

Notwithstanding such stability, or non-sensitiveness of our control, it is, however, sufficiently sensitive and responsive to variations of speed, to automatically prevent the engine from "running away" in case of an emergency, an accident, or when the load is suddenly thrown off the engine, as by means of the reverse-clutch pulley which is used in connection with drilling engines.

From the foregoing it will be readily understood by those skilled in the art of operating deep-well drills, that our improved control is adapted to produce the full range of speeds that are required in this exacting line of service, so that the proper motion may be imparted to the tools, as required by all the various circumstances and conditions of service, and that any variation of speed between the maximum and minimum limits, however slight the variation may be, may be produced at will in this improved control.

We claim the following:

1. In a drilling engine, the combination of a centrifugally operated motive-fluid controlling device driven by the engine, a support, a control sleeve threaded in said support whereby said sleeve is capable of fine adjustment, abutments on said sleeve forming maximum and minimum adjustment stops, a tubular adjusting screw threaded into said sleeve, a rod having one end in operative engagement with said controlling device and the other end extending into said tubular adjusting screw, a spring reacting between said tubular adjusting screw and said rod, and means operable from a distance for turning said control sleeve.

2. In a drilling engine, the combination of a centrifugalily operated motive-fluid controlling device driven by the engine, a support, a control sleeve threaded in said support, a fixed stop and an oppositely disposed adjustable stop on said sleeve whereby the movements of said sleeve in said support are limited, a tubular adjusting screw threaded into said sleeve, a rod having one end in operative engagement with said controlling device and the other end extending into said tubular adjusting screw, a spring reacting between said tubular adjusting screw and said rod, and means operable from a distance for turning said control sleeve.

3. In a drilling engine, the combination of a centrifugally operated motive-fluid controlling device driven by the engine, a support, a control sleeve threaded through said support, a fixed stop on said sleeve on one side of said support, a nut threaded on said sleeve on the other side of said support, a tubular adjusting screw threaded into said sleeve, a rod having one end in operative engagement with said controlling device and the other end extending into said tubular adjusting screw, a spring reacting between said tubular adjusting screw and said rod, and means operable from a distance for turning said control sleeve.

4. In a drilling engine, the combination of a centrifugally operated motive-fluid controlling device driven by the engine, a support, a control sleeve threaded in said support, a tubular adjusting screw threaded in said sleeve, a rod having one end in operative engagement with said controlling device and the other end extending into said adjusting screw, a spring reacting between said tubular adjusting screw and said rod, means operable from a distance for turning said sleeve, and stop means limiting the movement thereof in both directions.

5. In a drilling engine, the combination of a centrifugally operated motive-fluid controlling device driven by the engine, a support, a control sleeve threaded in said support, an adjusting screw threaded in said sleeve, a spring reacting betwen said screw and said controlling device, means operable from a distance for turning said sleeve, and stop means limiting the movement thereof in both directions.

6. In a drilling engine, the combination of a centrifugally operated motive-fluid controlling device driven by the engine, a support, a sleeve adjustable in said support, a member manually adjustable in said sleeve, a spring reacting between said member and said controlling device, means operable from a distance for adjusting said sleeve in said support, and an infinitesimally adjustable stop limiting the movement of said sleeve in a direction to increase the tension on said spring.

7. In a drilling engine, the combination of a centrifugally operated motive-fluid controlling device driven by the engine, a support, a manually operable screw-threaded member mounted in a cooperating screw-threaded bearing in said support, a spring interposed between said member and said controlling device, means operable from a distance for adjusting said member in said support, and a nut screw-threaded on said member and acting as a stop to limit its adjustability in one direction.

8. In a drilling engine, the combination of a centrifugally operated motive-fluid controlling device driven by the engine, a support, a manually operable screw-threaded member mounted in a cooperating screw-threaded bearing in said support, a spring interposed between said member and said controlling device, means operable from a distance for adjusting said member in said support, and an infinitesimally adjustable stop for said member to limit its adjustability in one direction.

In testimony whereof we affix our signatures.

CHARLES H. SHEASLEY.
EDGAR H. CROSSEN.